May 26, 1964 R. R. WILSON 3,134,602
PISTON RING
Filed Jan. 8, 1962
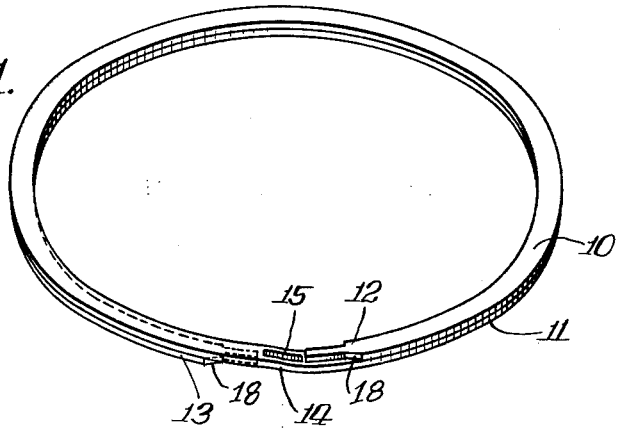
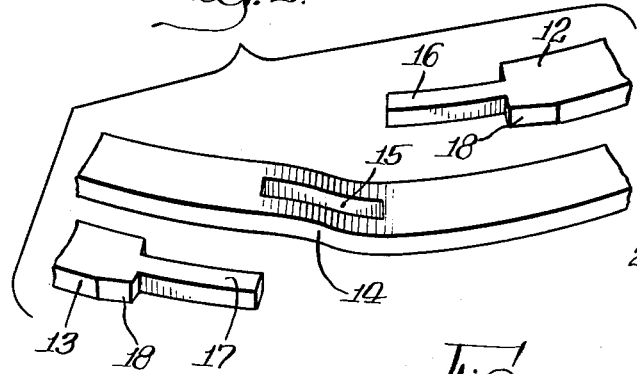
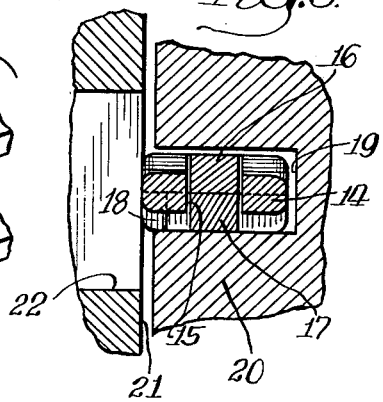
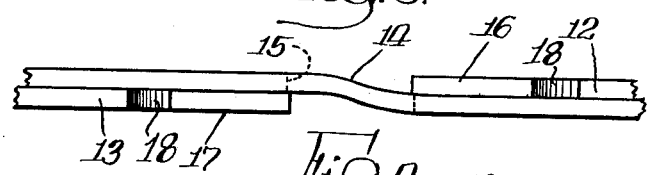
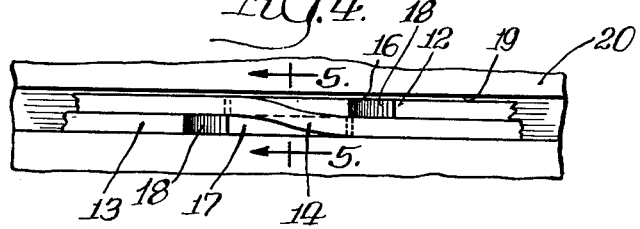
INVENTOR.
Robert R. Wilson,
BY
Davis, Lindsey, Hibben & Noyes
Atty's.

Patent 3,134,602 — Piston Ring

3,134,602
PISTON RING
Robert R. Wilson, Centerville, Ind., assignor, by mesne assignments, to Perfect Circle Corporation, a corporation of Indiana
Filed Jan. 8, 1962, Ser. No. 164,757
3 Claims. (Cl. 277—203)

This invention relates to piston rings and, more particularly, to piston rings for use in cylinders having ports in the cylinder wall.

In piston and cylinder devices such as two-cycle engines, the exhaust ports are commonly formed in each cylinder wall for the purpose of ridding the cylinders of the products of combustion. These exhaust ports are located to open into the combustion space of the cylinders when the pistons are adjacent the lower end of their stroke and are closed and opened by the reciprocating movement of the pistons. One difficulty encountered with this type of engine arises because the piston rings slide across the exhaust ports, and when the gap of such a ring is adjacent a port, the ring points or ends of the ring tend to expand into the port, resulting in damage to both the cylinder wall and the ring on movement of the piston. One solution to this problem has been to pin the rings in such a manner that the points cannot get into the ports, but this expedient is somewhat complex and expensive to manufacture and such a ring is difficult to assemble on the piston.

Therefore, it is the general object of this invention to provide an improved piston ring for use in a cylinder having a port in the cylinder wall, which ring has a novel construction for restraining the points so that they cannot protrude into the port formed in the cylinder wall.

It is another object to provide a piston ring of the foregoing character, which may be inexpensively manufactured and readily assembled on the piston.

Still another object is to provide a piston ring having means for restraining the points of the ring, which will not become ineffective as a result of wear.

Other objects and advantages of the invention will become apparent from the following description taken in conjunction with the accompanying figures of the drawing, in which:

FIG. 1 is a perspective view of a piston ring embodying the features of the invention;

FIG. 2 is an enlarged perspective view of a portion of the ring shown in FIG. 1;

FIG. 3 is an enlarged fragmentary elevational view of the outer periphery of the ring and showing the ring in its free state before being compressed within the cylinder;

FIG. 4 is a view similar to FIG. 3 but showing the ring when compressed within the cylinder; and FIG. 5 is an enlarged sectional view taken along the line 5—5 of FIG. 4 and showing the ring in relation to the piston and cylinder.

In general, a piston ring embodying the invention comprises a single strip of metal wound edgewise to form two substantially flat coils connected by a cross-over portion. The cross-over portion and the points or ends of the strip are formed to interengage whereby the points may be clipped to the cross-over portion and prevented from springing outwardly when the strip is compressed within the cylinder. To this end, a circumferentially extending slot is formed in the strip at the cross-over portion, in this instance intermediate the inner and outer peripheries of the ring, and each point or end of the strip is narrowed to form a circumferentially extending tab adapted to slide circumferentially into the slot in the cross-over portion, when the ring is compressed within the cylinder, to restrain the points against outward radial movement.

In greater detail, the ring comprises a single strip of metal, preferably sheet metal or steel rail stock, that is generally rectangular in cross section and has a substantially constant width and thickness. The edges of the strip are preferably rounded. The strip is wound edgewise to form two substantially flat coils, an upper coil indicated by the numeral 10, FIG. 1, and a lower coil indicated by the numeral 11. The section of the strip that is circumferentially equidistant from its two ends or points 12 and 13 is offset sidewise or axially of the ring an amount substantially equal to the thickness of the strip. This section is referred to as the cross-over portion and is indicated by the numeral 14. The outer edges of the two coils 10 and 11 and the cross-over portion 14 may be chrome plated if desired.

With reference to FIG. 2, a circumferentially extending slot 15 is formed in the cross-over portion 14 and the points 12 and 13 are respectively provided with circumferentially extending tabs 16 and 17. This slot 15 extends through the strip from its upper side to its under side and is of a width sufficient to receive the tabs 16 and 17. The longitudinal center lines of the slot 15 and the tabs 16 and 17 are equidistant from the edges of the strip, so that the edges of the points 12 and 13 and the edges of the cross-over portion 14 are substantially flush with each other when the tabs 16 and 17 are positioned in the slot 15.

FIGS. 1 to 3 show the ring in its free or expanded condition and FIGS. 4 and 5 show the ring positioned on a piston and compressed at it would be when within the cylinder. To install the ring on a piston 20, the ring is expanded and disposed around the piston 20, and the ring is then positioned in a circumferential piston ring groove 19 formed in the piston 20. When the ring is in its free or expanded condition in the piston ring groove 19, the tabs 16 and 17 are displaced circumferentially away from the slot 15 in the cross-over portion 14, as shown in FIG. 3. When the ring is compressed to the size of the cylinder wall indicated at 21, the tabs 16 and 17 slide into the slot 15 and overlap, the tab 16 being on top of the tab 17 as shown in FIGS. 4 and 5. The piston 20 and the ring may then be slipped into the cylinder formed by the wall 21. The tension of the ring when compressed causes the outer edge of the ring to exert pressure against the wall 21 of the cylinder, but the sides of the slot 15 prevent the tabs 16 and 17 from moving radially outward so that the points 12 and 13 cannot engage in a port, such as the port 22 formed in the wall 21.

The slot 15 is made sufficiently long to normally provide a clearance between the ends of the tabs 16 and 17 and the ends of the slot 15 (see FIG. 4) so that the lengths of the tabs and the slot do not have to be held to close tolerances. However, the length of the tabs 16 and 17 is made long enough to prevent the tabs from coming out of the slot 15 if the ring expands and the tabs 16 and 17 move circumferentially away from each other due to wearing of the ring.

It is apparent that, when the piston and ring are installed in a cylinder of the above described character, the points 12 and 13 cannot protrude into the port 22 formed in the cylinder wall 21 because the tabs 16 and 17 are held by the sides of the slot 15 and cannot move outward. The end portions of the points 12 and 13, indicated by the numeral 18, may be relieved as shown in FIG. 2 to make certain that the points 12 and 13 do not get into the port 22. Since the tabs 16 and 17 are free to move circumferentially and still be held by the sides of the slot 15, expansion due to heat and opening up due to wear are permitted without loss of the restraining feature. The ring has another advantage in that fewer rings may be required on a piston because the two coils 10 and 11 are in contact with the cylinder wall substantially over their entire circumference and the cross-over portion 14 engages the cylinder wall between the ends of the coils. A further important advantage of the ring is that it may be easily and inexpensively manufactured because the slot 15 and the offset at the cross-over portion 14 and the tabs 16 and 17 may be easily formed by a punching process, and the ring may be easily installed on a piston.

I claim:

1. A piston ring comprising a strip of metal wound edgewise to form two substantially flat coils, the section of said strip substantially equidistant circumferentially from the points of said strip being offset sidewise an amount substantially equal to the thickness of said strip, a circumferentially extending slot formed in said strip at said offset section intermediate the inner and outer edges of said strip, a circumferentially extending tab formed on each of said points of said strip intermediate the inner and outer edges of said strip, the length of said strip being such that said tabs extend into said slot and overlap each other when said strip is compressed within a cylinder, and said slot being sufficiently long to provide a clearance between the ends of said slot and the ends of said tabs when said strip is compressed with a cylinder.

2. A ring as in claim 1, wherein one of said tabs extends into one end of said slot and the other of said tabs extends into the other end of said slot when said strip is compressed within a cylinder.

3. A ring as in claim 1, wherein the outer edges of the end portions of said points adjacent said tabs are relieved.

References Cited in the file of this patent

UNITED STATES PATENTS

| | | |
|---|---|---|
| 1,280,343 | Westerhouse | Oct. 1, 1918 |
| 2,519,684 | Marien | Aug. 22, 1950 |

FOREIGN PATENTS

| | | |
|---|---|---|
| 515,230 | Great Britain | Nov. 29, 1939 |